US010655997B2

(12) United States Patent
Pathier et al.

(10) Patent No.: US 10,655,997 B2
(45) Date of Patent: *May 19, 2020

(54) FLOWMETER FOR TWO-PHASE FLUID WITH SIMULTANEOUS OR ALTERNATING MEASUREMENT OF THE GAS PHASE AND THE LIQUID PHASE

(71) Applicant: L'Air Liquide, Societe Anonyme pour l'Etude et l'Exploitation des Procedes Georges Claude, Paris (FR)

(72) Inventors: Didier Pathier, Voisins Bretonneux (FR); Vincent Alaterre, Montigny le Bretonneux (FR)

(73) Assignee: L'Air Liquide Societe Anonyme Pour L'Etude Et L'Exploitation Des Procedes Georges Claude, Paris (FR)

(*) Notice: Subject to any disclaimer, the term of this patent is extended or adjusted under 35 U.S.C. 154(b) by 0 days.

This patent is subject to a terminal disclaimer.

(21) Appl. No.: 16/240,246

(22) Filed: Jan. 4, 2019

(65) Prior Publication Data

US 2019/0137312 A1 May 9, 2019

Related U.S. Application Data

(62) Division of application No. 15/038,408, filed as application No. PCT/FR2014/052893 on Nov. 13, 2014, now Pat. No. 10,197,425.

(30) Foreign Application Priority Data

Nov. 21, 2013 (FR) ...................................... 13 61472

(51) Int. Cl.
*G01F 1/74* (2006.01)
*G01F 1/76* (2006.01)
(Continued)

(52) U.S. Cl.
CPC ................. *G01F 1/74* (2013.01); *G01F 1/76* (2013.01); *G01F 15/001* (2013.01); *G01F 15/005* (2013.01); *G01F 15/08* (2013.01)

(58) Field of Classification Search
None
See application file for complete search history.

(56) References Cited

U.S. PATENT DOCUMENTS

| 5,679,905 | A | 10/1997 | Wardle |
| 7,013,740 | B2 | 3/2006 | Dutton et al. |
| 2014/0238124 | A1* | 8/2014 | Dallais .................... G01F 1/007 73/200 |

FOREIGN PATENT DOCUMENTS

| CN | 200 955 971 | 10/2007 |
| WO | WO 2012/160293 | 11/2012 |

OTHER PUBLICATIONS

International Search Report and Written Opinion for PCT/FR2014/052893, dated Mar. 2, 2015.

(Continued)

*Primary Examiner* — Justin N Olamit
(74) *Attorney, Agent, or Firm* — Christopher J. Cronin

(57) ABSTRACT

The invention relates to a flowmeter for liquid/gas two-phase cryogenic fluids, including: a separator of the liquid/gas phases, preferably made up of vessel, the cryogenic fluid being admitted into the top portion of said vessel; a liquid flow sensor, located on a liquid pipe in fluid communication with the bottom portion of the vessel, the vessel being placed in the top position in the space relative to the liquid flow sensor; a gas pipe, in fluid communication with the upper portion of the vessel, provided with a flow sensor of the gas phase circulating in said gas pipe; a three-way valve capable of recovering, in two of the channels thereof (A/B), the downstream end of said gas pipe and the downstream end of said liquid pipe; and a device for measuring the level of liquid in the vessel, preferably comprising two level sensors: a bottom level sensor and a top level sensor.

4 Claims, 4 Drawing Sheets

(51) Int. Cl.
*G01F 15/00* (2006.01)
*G01F 15/08* (2006.01)

(56) References Cited

OTHER PUBLICATIONS

French Search Report and Written Opinion for FR 1 361 472, dated Jul. 14, 2014.

\* cited by examiner

FLOWMETER FOR TWO-PHASE FLUID WITH SIMULTANEOUS OR ALTERNATING MEASUREMENT OF THE GAS PHASE AND THE LIQUID PHASE

CROSS-REFERENCE TO RELATED APPLICATIONS

The present application is a divisional application of U.S. application Ser. No. 15/038,408, filed May 20, 2016, which is a § 371 of International PCT Application PCT/FR2014/052893, filed Nov. 13, 2014, which claims § 119(a) foreign priority to French patent application FR1361472, filed Nov. 21, 2013, all of which is being incorporated by reference herein in its entirety for all purposes.

BACKGROUND

Field of the Invention

The present invention relates the field of flowmeters for gas/liquid two-phase fluids.

Related Art

Measuring the flow rate of a two-phase fluid composed of a liquid and a gas is a difficult operation when it is desired to measure a mass flow rate. Indeed, all sensors that measure a flow rate are disturbed when they are brought into contact with a two-phase liquid, the density of which changes at any moment. This is in particular valid for measuring the flow rate of cryogenic fluids such as liquid nitrogen.

Certain flowmeters listed in the literature are based on the measurement of the velocity of the fluid. These are for example:
  turbine flowmeters: a turbine is installed in the fluid in motion and the rotational speed of the turbine gives a representation of the velocity of the fluid.
  Pitot tube flowmeters: two tubes are installed in the fluid in motion to be measured. One tube is installed perpendicular to the flow and gives the static pressure, the other is installed parallel to the flow and gives the total dynamic pressure. The dynamic pressure difference between these two measurements makes it possible to calculate the flow rate.
  Ultrasonic flowmeters: some use the Doppler effect (analysis of the frequency reflected by the particles of the fluid that gives a representation of the velocity of the particle and therefore of the fluid) while others measure a difference in transit time of an ultrasonic wave from upstream to downstream and from downstream to upstream (representation of the velocity of the fluid).

In all these cases, when the density of the fluid varies continuously, the change from volume flow rate to mass flow rate is difficult to carry out accurately.

Other systems use the measurement of head loss (pressure loss) in order to deduce the flow rate therefrom. These are for example calibrated orifice flowmeters that measure the head loss upstream and downstream of a calibrated orifice placed in the fluid in motion. The measurement from these devices is highly disturbed when the fluid does not have a constant density and when the content of gas increases in the liquid.

Electromagnetic flowmeters, applicable only to fluids having a sufficient electrical conductivity, use the principle of electromagnetic induction: an electromagnetic field is applied to the fluid and the electromotive force created (force proportional to the flow rate of the fluid) is measured. In the case of measuring the flow rate of (nonconductive) cryogenic fluids such as liquid nitrogen, this principle is not applicable.

Vortex flowmeters are based on the phenomenon of generation of vortices that are observed behind a fixed bluff body placed in a fluid in motion (Karman effect). Measuring the pressure variations created by these vortices gives the frequency of the vortices, which is itself proportional to the velocity of the fluid when the fluid retains constant properties. When the density of the fluid varies, the measurement is distorted.

Thermal flowmeters are those based on measuring the increase in temperature created by a constant supply of energy. A system with two temperature probes measures the temperature difference between the flow entering and leaving the flowmeter. Between these two probes, a resistance heater provides a known amount of energy. When the heat capacity of the fluid in motion is known, the flow rate may be calculated from these measurements. However, this principle is not applicable to two-phase liquids, of which the thermal behavior (vaporization of the liquid) is completely different from single-phase liquids.

Only a Coriolis mass flowmeter gives an accurate measurement of the mass flow rate of a fluid. The flowmeter consists of a U-shaped or omega-shaped or curved tube in which the fluid circulates. The U-shape is subjected to a lateral oscillation and the measurement of the phase shift of the vibrations between the two arms of the U-shape gives a representation of the mass flow rate. However, its cost is relatively high and when it is used at very low temperatures (liquid nitrogen at −196° C. for example) and with a fluid that has a density that varies enormously and that comprises a large portion in the gas phase, there is a need to highly insulate the system (efficient insulation such as vacuum insulation for example), and despite all that, the measurements are distorted when the gas content exceeds a few percent by mass. It will also be noted that the measurement is often rendered impossible when the velocity of the fluid is low or zero (in the first half of the measurement range).

As may be observed, the measurement of the flow rate of a two-please liquid and in particular the measurement of the flow rate of a cryogenic fluid with an acceptable accuracy is not easy to carry out with the apparatus currently available on the market.

The literature has then proposed other types of solutions, including systems based on the principle of measuring the level of a liquid flowing in a channel just before a restriction of the flow area. This system, described in document U.S. Pat. No. 5,679,905 operates in substance as follows: the two-phase fluid is firstly separated into a gas phase which is not measured and a liquid phase, the flow rate of which is measured. This liquid passes into a channel which has a reduction in cross section at its outlet. The higher the flow rate, the higher the level of liquid in the channel and a measurement of the level in this channel makes it possible to deduce the instantaneous flow rate. As is observed, this system does not take into account the gaseous flow rate which, in certain applications, is negligible. On the other hand, this system makes it possible to measure, with a relatively good accuracy, the liquid flow rate without being disturbed by the gas content, which is the desired objective.

It will be noted in passing that in order for this system to operate correctly, it must be well insulated from heat gains that could vaporize a portion of the insulated liquid and thus disturb the measurement of the level. This is why vacuum insulation is used in this system.

It will also be noted that in order for the system to operate, there must be the presence of two phases in the flowmeter, which prohibits the operation thereof with a subcooled liquid (pure liquid with no gas phase).

In the case where the measurement of the flow rates of liquid and of gas is necessary, use is sometimes made of a system that takes up the same principle of separation of the phases before the flow rate measurement.

Thus, systems have the following device:
the two-phase liquid passes firstly into a phase separator that separates the liquid phase from the gas phase;
the gas phase is sent to a volumetric flowmeter (of turbine type for example) with a temperature compensation;
the liquid phase is also sent to a volumetric flowmeter (of turbine type for example);
these two flow rate measurements are then converted into a mass measurement and are added.

A priori, this device is more expensive than the preceding one, it may be believed that it will be very accurate. In practice, it is observed that the measurement of the liquid flow rate is marred by errors that fluctuate depending on the pressure and temperature conditions of the liquid entering the flowmeter. These measurement errors are due to the presence of gas in the liquid phase that passes through the flowmeter. Indeed, when the liquid leaves the phase separator in order to go to the flowmeter, a portion of liquid vaporizes, either because of heat gains or because of the drop in pressure due to a rise of the liquid, or because of a drop in pressure due to the head loss created by the flowmeter itself.

Finally, in order to measure the flow rate of a cryogenic liquid, it is also possible to avoid the problems cited above by creating pressure and temperature conditions different from the equilibrium pressure (boiling range). In this field, the method most commonly used is increasing the pressure of the liquid. In practice, a flowmeter will for example be installed at the outlet of a cryogenic pump (high-pressure side). In this case, the liquid is for example pumped into a tank where it is at equilibrium and it is raised in pressure by the pump, with almost no increase in temperature. The pipes and the flowmeter that follow may then create a head loss, this will not result in the liquid vaporizing provided that the head loss is significantly lower than the increase in pressure created by the pump.

In this case, it is possible to use a conventional flowmeter of vortex, turbine or other type insofar as it withstands the low temperatures.

This technique is for example perfectly suitable for the flow rate measurement of nitrogen delivery trucks. It is reliable and has an acceptable cost insofar as the cryogenic pump is required for other reasons.

On the other hand, when it is necessary to measure the flow rate of liquid nitrogen at a point where there is no cryogenic pump, then this technique is no longer advantageous.

SUMMARY OF THE INVENTION

The present invention then endeavors to propose a novel, simple and reliable solution for measuring the flow rate of two-phase liquid/gas cryogenic fluids that makes it possible to solve all or some of the technical problems mentioned above.

As will be seen in further detail in what follows, the solution proposed here may be summarized thus:

The fluid arrives at a pressure that is variable, but generally low (between 1 and 6 bar).

The fluid arrives under known or unknown pressure and temperature conditions. In particular, the liquid phase may be at equilibrium (boiling range).

The fluid may be composed of a liquid phase and of a gas phase (two-phase liquid) in a variable proportion.

No device enabling the pressure to be increased (pump) is required or available in the equipment.

The solution may be applied to any fluid when the latter has a boiling point below the ambient temperature of the place where the flowmeter is installed.

The device proposed comprises the following components:

A tank acting as a phase separator, this tank is advantageously equipped with a liquid-phase level sensor, a liquid temperature sensor and a gas-phase pressure sensor. It is understood that according to the invention the use of a tank or volume where the liquid is at rest in order to enable the separation of the phases is favored, but it is also possible to use a large pipe that will act as this separator.

A line for supplying two-phase fluid connected to the upper portion of the tank.

A line connecting the top of the tank (therefore in communication with the gas phase present at the top of the tank) to an inlet of a 3-way valve and that passes through a gas flow rate sensor. This line is equipped with a temperature sensor for the gas circulating in this gas line.

A line connecting the bottom of the tank (therefore in communication with the liquid phase stored in the bottom of the tank) to another inlet of the 3-way valve mentioned above and that passes through a liquid flow rate sensor.

A two-phase fluid outlet line connected to the $3^{rd}$ port of the 3-way valve: the third port, outlet port of the valve, combining the whole of these two inputs (mixture) in order to send it for example to a downstream station that uses such a fluid (cryogenic tunnel, drum or other for example).

The assembly is preferably thermally insulated.

As was explained above, in order for the measurement of the liquid phase to be accurate, the liquid circulating in the liquid flow rate sensor must contain no (or virtually no) gas. Each gas bubble that passes into the sensor results in a large measurement error.

In order to carry out an accurate measurement, this system in accordance with the invention performs the following actions:

separation of the two phases of the fluid: the fluid arrives in the tank which is in fact a phase separator. The liquid accumulates naturally in the bottom of the tank and the gas in the top portion of the tank.

measurement of the gas mass flow rate: this measurement is carried out in a conventional manner that is well known to those skilled in the art, the gas phase of the fluid passes through the flowmeter present in the gas line, which measures the volume flow rate of the gas. This flowmeter may for example be of vortex, ultrasonic, turbine or calibrated orifice type. The temperature probe measures the temperature of the gas, the pressure sensor measures its pressure. By considering these two measurements, for a given gas, the computer of the system calculates the density of the gas passing into the flowmeter. By thus having the volumetric flow rate and the density of the gas, the computer then calculates, in a known manner, the mass flow rate of the gas. The measurement of the mass flow rate of the gas may also be carried out directly by means of a thermal or Coriolis flowmeter.

Measurement of the liquid mass flow rate: it was said above that this measurement is more difficult. Considering furthermore that the liquid represents in certain applications such as cryogenic applications more than 95% of the mass flow rate, it is on the accuracy of this measurement that the (overall) measurement accuracy of the apparatus depends. In order to carry out this measurement without creating gas bubbles in a liquid, it is performed, owing to the invention, in the following manner: on leaving the tank, the liquid is at its liquid/vapor equilibrium point. Any drop in pressure, however minimal it may be, gives rise to the appearance of gas bubbles that substantially disturb the measurement. A slight overpressure of the liquid is thus created by installing the liquid flowmeter (present in the liquid outlet line) at a sufficient distance below the tank, preferably between 0.5 and 6 meters below the level of the tank, typically around 1 meter. In other words, the tank is placed in an "elevated" position (height "h") relative to the liquid flow rate sensor.

With this arrangement that makes it possible to create a very slight overpressure due to the pressure head of the liquid in the (thermally insulated) down pipe, the liquid arrives at the flowmeter very slightly subcooled. Between the outlet of the tank and the flowmeter, the temperature of the liquid does not change but its pressure increases. It is then possible to measure the volumetric flow rate of the liquid without creating gas bubbles provided that the flow rate sensor does not give rise to a head loss greater than the overpressure created by the difference in height between the tank and the flowmeter. The liquid flowmeter used may for example be of vortex, ultrasonic or else turbine type. The volumetric flow rate thus measured is then corrected by the density of the liquid in order to obtain the mass flow rate. This liquid density is calculated by the computer of the system owing to the temperature of the liquid measured by the temperature sensor with which the tank is equipped as mentioned above.

mixing of the two phases and outlet of the fluid: The gaseous portion and the liquid portion that pass respectively through a gas flowmeter and a liquid flowmeter are then mixed at the three-way valve before leaving the apparatus.

According to the invention, this three-way valve is controlled according to one of the methods that will be explained better below, but those skilled in the art understand, in view of the aforegoing, that it represents a sort of "mixer tap" which mixes the gaseous nitrogen and the liquid nitrogen that arrive thereat in proportions that it is possible to dictate (and thus to dictate what leaves this valve at its third port).

The 3-way valve is slaved to the level of liquid in the tank via the information given by the liquid level sensor with which the tank is equipped.

By way of illustration, when the level of liquid in the tank is below a low setpoint value, the 3-way valve is positioned in order to raise the level: it allows gas through and closes the passage of the liquid. Thus, the level of liquid will rise in the tank.

Still by way of illustration, when the level of liquid is between a low setpoint value and a high setpoint value in the tank, the 3-way valve is positioned to allow the liquid and the gas liquid through in an amount more or less equal to 50/50. According to one of the embodiments, it may be envisaged that the valve lets the liquid and the gas through in proportions that are different and even variable according to the value of the level of liquid.

Still by way of illustration, when the level of liquid is above a high setpoint value in the tank, the three-way valve is positioned in order to lower the level: it closes the passage of the gas and lets through the liquid, thus the level of liquid will drop in the tank.

Thus, owing to such a method of control, the level of liquid in the tank remains between a low setpoint value and a high setpoint value and the liquid flow rate sensor only allows liquid with no gas bubbles through.

An accurate measurement of the mass flow rate of the gas and of the liquid is thus obtained. The computer may then either display the total mass flow rate or the mass flow rates of the gas and liquid phases separately. Other methods of display may be envisaged in order for example to display the energy equivalent of the fluid flow rate or to display the mass and volume contents of gas in the fluid.

The present invention thus relates to a flowmeter for two-phase liquid/gas cryogenic fluids, comprising:
- a liquid/gas phase separator, preferably consisting of a tank, into the upper portion of which the cryogenic fluid is introduced;
- a liquid flow rate sensor, located in a liquid line in fluid communication with the bottom portion of the tank, the tank being placed in an elevated position in space relative to the liquid flow rate sensor;
- a gas line, in fluid communication with the top portion of the tank, provided with a flow rate sensor for the gas phase circulating in this gas line;
- a three-way valve capable of recovering at two of its ports on the one hand the downstream end of said gas line and on the other hand the downstream end of said liquid line;
- a device for measuring the level of liquid in the tank, preferably comprising two level sensors, a bottom level sensor and a top level sensor.

The invention could furthermore adopt one or more of the following features:
Use is made of a liquid flowmeter having a head loss that is as low as possible.

It will be recalled that the suppliers of flowmeters give this information in the specifications of the flowmeters that they sell.

Indeed, this disposition proves very particularly advantageous for ensuring the fact that the head loss created by the liquid flowmeter is less than the pressure head between the tank and the liquid flowmeter, and thus for ensuring that it is not necessary to set up too great a distance between the tank and the liquid flowmeter, too great a distance (for example several meters) which would render the apparatus difficult to install in industrial premises.

By way of illustration, the head loss of the liquid flow rate sensor is less than the pressure head of the liquid between the bottom portion of the tank and the liquid flow rate sensor, and preferably less than 2 meters of liquid height.

Use is made of a liquid flowmeter selected from the bottom portion of its measurement range recommended by the manufacturer. Working at low flow rate, the flowmeter then creates a very low head loss. By way of illustration, at 30% of its maximum flow rate, the head loss of the flowmeters on the market is conventionally close to 10% of its maximum head loss (flow rate divided by 3, head loss divided by 10).

By way of illustration, since the liquid flow rate sensor is sold for use within a recommended range of flow rates, a range delimited by a recommended low flow rate and a recommended high flow rate, the flow rate of liquid circulating in the liquid line is always located within a low narrow range located between said recommended low flow rate and 30 to 70% of said recommended high flow rate.

In other words, the chosen flowmeter is "oversized" by using a flowmeter in its low measurement range: by way of example, a flowmeter recommended for use in the range 300-3000 l/h will be used over its lower range of from 300 to 1500 l/h.

It could be considered that this disposition has the drawback of reducing the measurement range of the sensor. By way of illustration, a sensor that initially has a measurement range that varies from 1 to 10 (300 to 3000 l/h) can only be used with this technique over a range for example of from 1 to 5. This may appear to be a factor that limits the use of this technique.

It is then proposed to resort to an advantageous method of implementation of the invention, according to which use is made of the liquid flowmeter selected in a discontinuous manner in accordance with the following two operating phases:

during a Phase 1 (which may be described as a "storage" phase): the liquid flowmeter measures a flow rate greater than the flow rate leaving via the $3^{rd}$ port of the 3-way valve (and therefore greater than the flow rate leaving the apparatus) by the fact that a "storage" of liquid is carried out. Indeed, a portion of the liquid flow extracted from the tank and that passes through the liquid flowmeter leaves the apparatus (via the $3^{rd}$ port) while another portion (for example in a 50/50 ratio) of the liquid flow extracted from the tank and that passes through the liquid flowmeter is allowed by the controller and the three-way valve to rise up in the gas line (line used normally to make the gas descend to the 3-way valve). The liquid thus accumulates in this gas line. When the levels in the tank and in the line approach one another, the pressure difference decreases and the flow rate slows down, which is detected at the liquid flowmeter when the value measured becomes less than the minimum flow rate of its specifications (for example 300 l/h in the case mentioned above). In this case, the automatic operation (controller) of the system positions the 3-way valve so as to block the passage of the liquid, the flow rate then gradually changes from 300 to 0 l/h.

during a Phase 2 (which may be described as a "withdrawal" phase: blockage of the flow in the liquid flowmeter and "withdrawal" of the liquid accumulated in the gas line): When the 3-way valve blocks the passage of the liquid and allows through the gas, the liquid stored in the gas line is then discharged via the outlet of the apparatus ($3^{rd}$ port). When there is no longer any liquid, the apparatus then delivers gas and the level of liquid in the tank rises. When this level passes above a threshold (high setpoint value), the automatic operation then opens the valve on the gas side and liquid side (for example 50/50) and Phase 1 is then returned to.

Thus, by this alternating operation, the apparatus may measure flow rates in a very broad range, practically from 150 to 1500 l/h in our example, i.e. a range from 1 to 10 as desired at the start.

In other words, this discontinuous operation of the liquid flowmeter with "storage" then "withdrawal" of the liquid makes it possible to only operate the flowmeter in its nominal range while ultimately obtaining a mean flow rate below the low value of the nominal range.

a data acquisition and processing system is available, which is capable:
i) of acquiring a measurement of the level of liquid in said separator;
j) of comparing this measurement to at least one setpoint value of the level of liquid in the separator,
k) and, depending on the result of this comparison, of performing feedback on the operation of the three-way valve in order to dictate a ratio of the two fluids arriving respectively in the liquid and gas branches of the valve, and thus dictating the composition of the mixture leaving its third port (feedback typically through a control system that controls the three-way valve).

One or more pressure and temperature sensors are available, which are capable of measuring the pressure in particular in the gas phase of the tank and of measuring the temperature in the liquid phase of the tank and where appropriate in the gas phase of the tank and/or in the gas phase leaving through said gas line.

The tests carried out with this system in accordance with the invention, used for the measurement of a liquid nitrogen flow rate, have shown that it was possible to obtain an accuracy of the order of 3% over a flow rate range that varies from 1 to 10 which is very satisfactory for numerous uses.

This system enables an accurate measurement of the flow rate of a two-phase fluid without a pressurizing device, irrespective of the pressure and temperature conditions thereof at the feed point of the system. This system may be applied to any two-phase gas/vapor fluid provided that, at the operating pressure of the system, the vaporization temperature of the fluid is below the ambient temperature of the place where the flowmeter is installed.

The invention will be better understood with the aid of the appended figures.

DETAILED DESCRIPTION OF THE INVENTION

Figure 1:
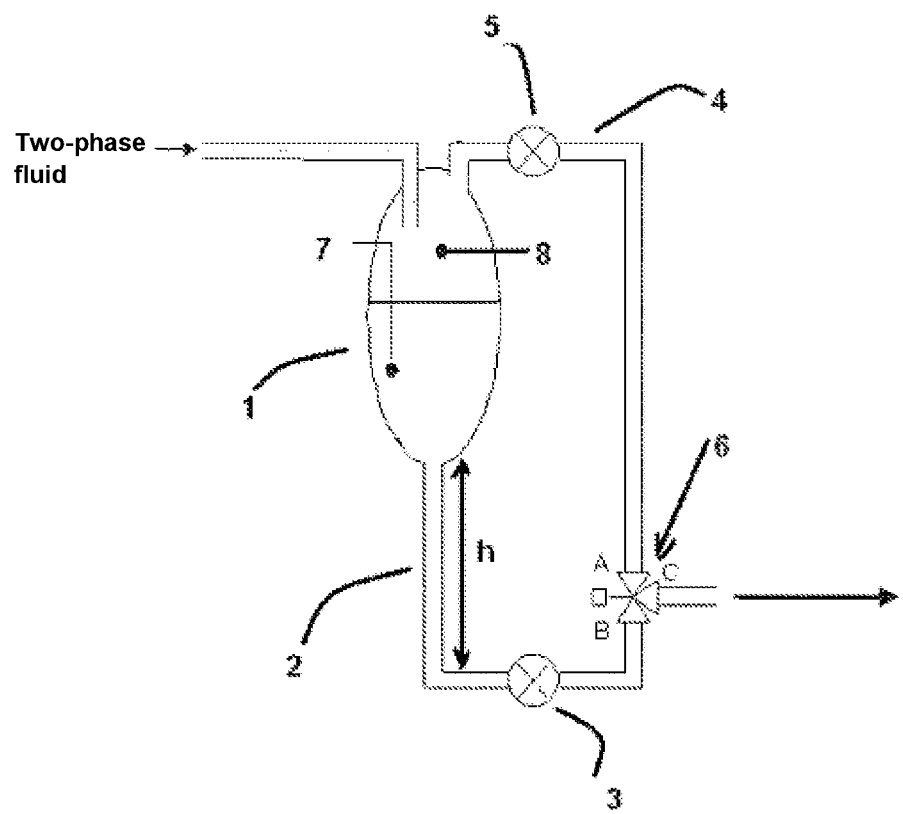
FIG. 1 is a schematic of the invention.

The presence of the following components is seen in FIG. 1:

a liquid/gas phase separator 1, here consisting of a tank, into the upper portion of which the two-phase cryogenic fluid is introduced;

a liquid flow rate sensor 3, located in a liquid line 2 in fluid communication with the bottom portion of the tank, the tank being placed in an elevated position in space relative to the liquid flow rate sensor;

a gas line 4, in fluid communication with the top portion of the tank, provided with a flow rate sensor 5 for the gas phase circulating in this gas line;

a three-way valve 6 capable of recovering at two of its ports (A, B) on the one hand the downstream end of said gas line and on the other hand the downstream end of said liquid line;

a measurement device 7 for measuring the level of liquid in the tank, preferably comprising two level sensors, a bottom level sensor and a top level sensor;

the tank is furthermore provided here with a pressure sensor 8 in the gas phase located in the top position of the tank but a detailed description will not be given here of the various pressure and temperature sensors that may be present in the equipment, and that are capable of measuring the pressure in particular in the gas phase of the tank and of measuring the temperature in the liquid phase of the tank and where appropriate in the gas phase of the tank and/or in the gas phase leaving through said gas line, for reasons well known to those skilled in the art.

Figures 2I, 2J, 2K:
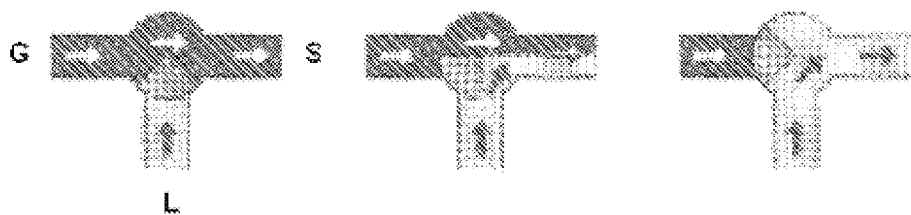
FIG. 2*i* is an illustration of operation of the 3-way valve where the system orders closure of the liquid port and opening of the gas port.
FIG. 2*j* is an illustration of operation of the 3-way valve where the system orders opening of the liquid port and gas port.
FIG. 2*k* is an illustration of operation of the 3-way valve where the system orders closure of the gas port and opening of the liquid port.

FIGS. 2i, 2j, and 2k then it makes possible to better visualize the operation of the three-way valve.

The inlet "G" denotes the inlet of the gas port, the inlet "L" denotes the inlet of the liquid port and the port "S" denotes the outlet of the valve.

Thus in FIG. 2i the case where the system orders the closure of the liquid port and the opening of the gas port has been illustrated.

In FIG. 2j the case where the system orders the opening of the liquid port and the opening of the gas port, for example in proportions of 50-50, has been illustrated.

And FIG. 2k illustrates the case where the system orders the closure of the gas port and the opening of the liquid port.

The following figures that illustrate various operating phases of the flowmeter and especially control scenarios will now be examined.

As has been stated, the valve 6 is slaved to the level of liquid in the tank via the information given by the level sensor 7.

Figure 3:
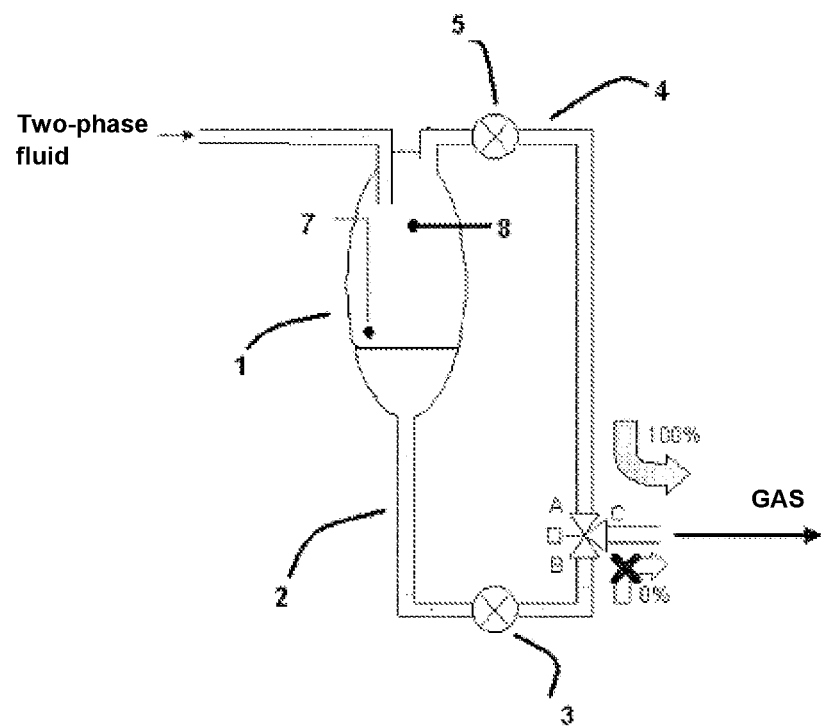
FIG. 3 is an illustration of operation of the invention where the level of liquid is below a low level setpoint value.

As FIG. 3 illustrates, when the level of liquid is below a low level setpoint value, the valve 6 is positioned by the controller in order to raise the level in the tank: it allows gas through and closes the passage of the liquid. Thus, the level of liquid will rise in the tank.

Figure 4:
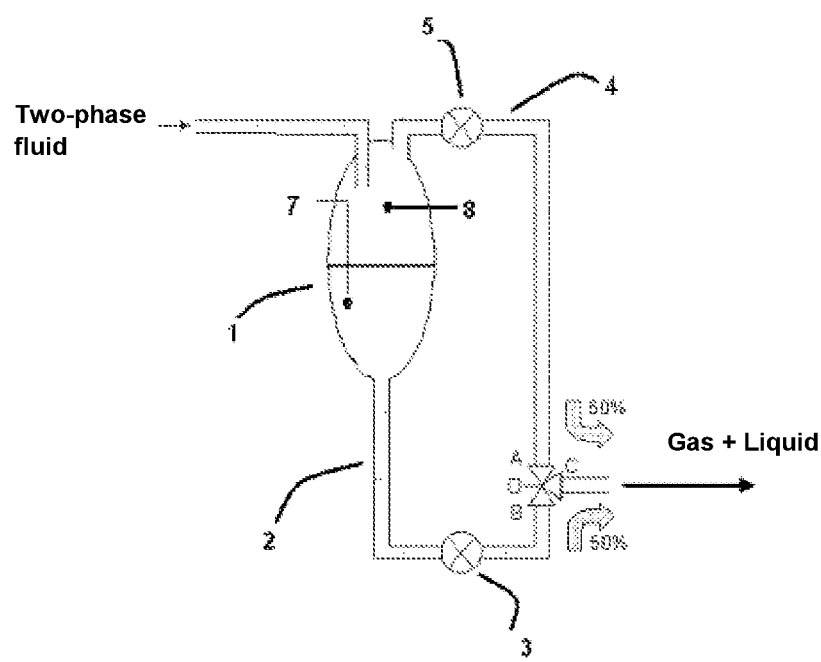
FIG. 4 is an illustration of operation of the invention where the level of liquid is between a low level setpoint value and a high level setpoint value.

When the level of liquid is between a low level setpoint value and a high level setpoint value (FIG. 4), the valve 6 is positioned to allow the liquid and the gas through in amounts that are for example substantially equal. In certain cases, it may be envisaged that the valve lets the liquid and the gas through in proportions that are different and even variable according to the value of the level of liquid.

Figure 5:
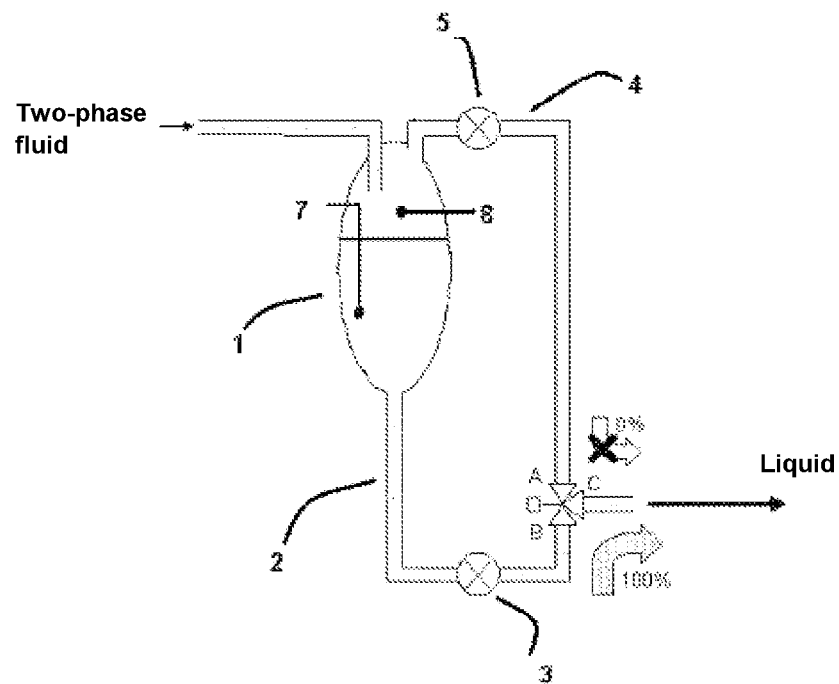
FIG. 5 is an illustration of operation of the invention where the level of liquid is above a high setpoint value.

When the level of liquid is above a high setpoint value (FIG. 5), the valve 6 is positioned in order to lower the level: it closes the passage of the gas and lets through the liquid which will lower the level of liquid in the tank 1.

Figure 6:
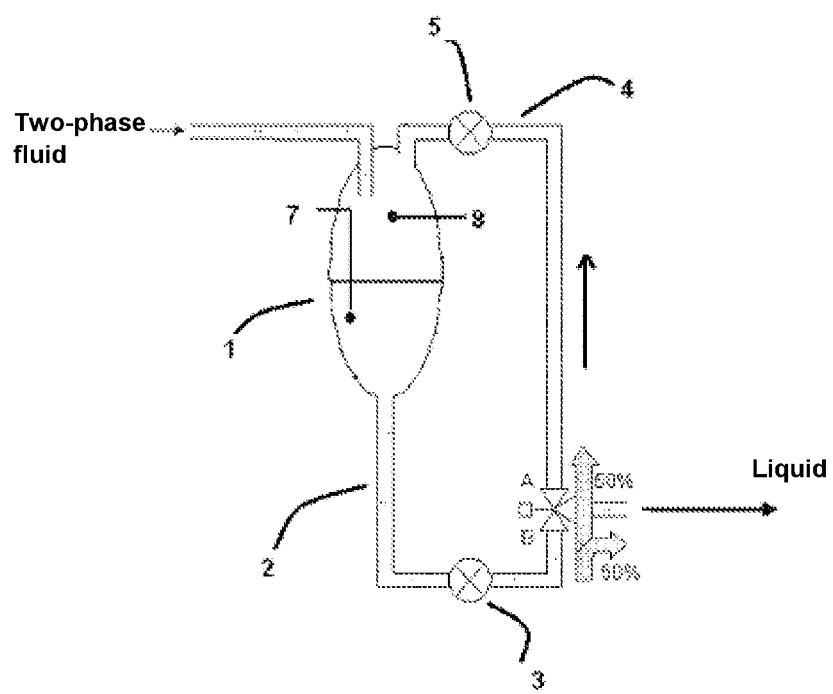
FIG. 6 is an illustration of operation of the invention during a "storage phase" of the liquid.

FIG. 6 illustrates the operation of the apparatus in Phase 1 explained above in the present description: this phase 1 is also referred to as "storage phase" of the liquid.

The sensor 3 measures a flow rate greater than the flow rate that leaves the apparatus. Indeed, a portion of this flow rises up in the line 4 (provided for making the gas descend to the valve 6) and accumulates therein, until the levels in the tank and in the line 4 approach one another, the difference in pressure then decreases and the flow rate slows down.

Figure 7:
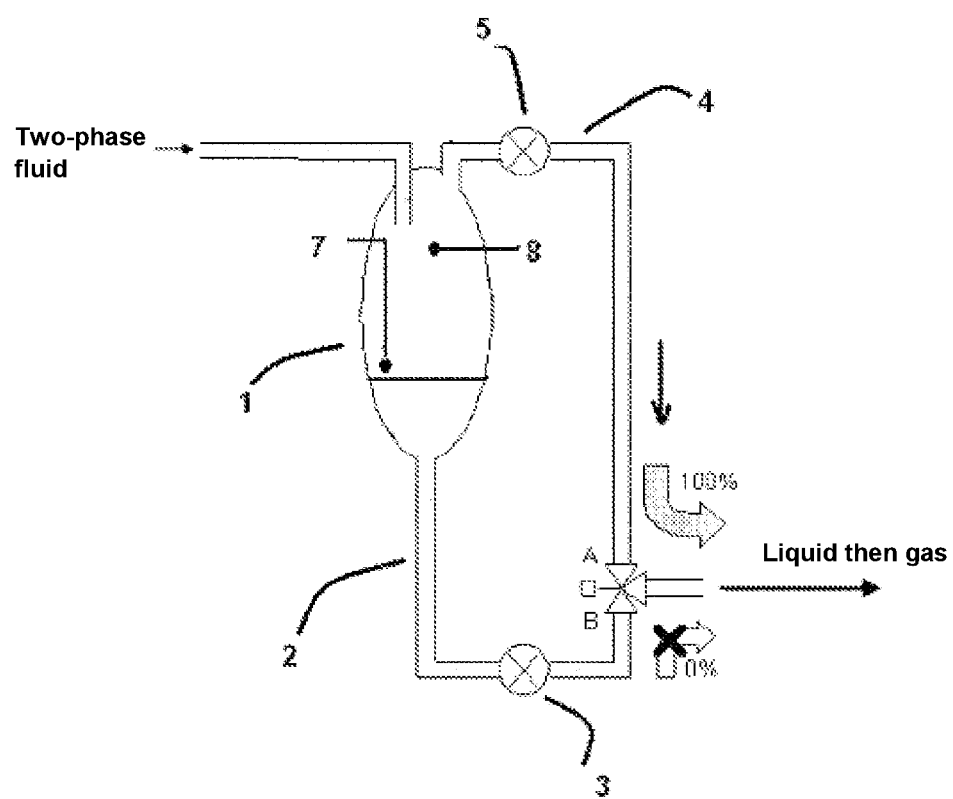
FIG. 7 is an illustration of operation of the invention where the valve is actuated to block the passage of the liquid.

The automatic operation of the system (controller) then detects this situation (value measured by the valve 6 below a minimum flow rate) and then positions the valve so as to block the passage of the liquid (FIG. 7), in order "to withdraw" the liquid stored in the line 4, the valve then delivers via its $3^{rd}$ outlet port liquid, then gas (when all the liquid is withdrawn), the level of liquid in the tank rises, until this level passes back between the high and low setpoint values, the controller will then reopen the valve on two sides (for example 50% gas side and 50% liquid side) etc., and phase 1 is returned to.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a" "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A flowmeter for two-phase liquid/gas cryogenic fluids adapted and configured to operate in a storage phase and operate in a withdrawal phase, said flowmeter comprising:

a liquid/gas phase separator, an upper portion of which receives the cryogenic fluid;

a liquid line in fluid communication with a bottom portion of the separator;

a liquid flow rate sensor located in the liquid line for measuring a flow rate of the liquid phase cryogenic fluid circulating therein, the separator being placed in an elevated position in space relative to the liquid flow rate sensor;

a gas line in fluid communication with the upper portion of the tank provided with a flow rate sensor for measuring a flow rate of the gas phase cryogenic fluid circulating therein;

a three-way valve having first, second, and third ports, the first port being in fluid communication with a downstream end of said gas line, the second port being in fluid communication with a downstream end of said liquid line, said three-way valve being configured and adapted to allow or disallow a flow of the gas phase cryogenic fluid via said first port and/or allow or disallow a flow of the liquid phase cryogenic fluid via said second port, the flow of the gas phase cryogenic fluid and/or liquid phase cryogenic fluid being directed by the third port to a downstream station that uses two-phase liquid/gas cryogenic fluid;

a bottom level sensor and a top level sensor adapted and configured to measure a level of liquid in the tank;

a controller adapted and configured:
  compare a level of liquid phase cryogenic fluid in the separator measured by the bottom and top level sensor to at least one setpoint value for a level of liquid phase cryogenic fluid in the separator;
  depending upon a result of said comparison, control operation of said three-way valve to allow or disallow the flow of gas phase cryogenic fluid into the first port and/or allow or disallow the flow of liquid phase cryogenic fluid into the second port, thus dictating a composition of the two-phase liquid/gas cryogenic fluid leaving the third port for the downstream station;
  determine a mass flow rate of the two-phase liquid/gas cryogenic fluid by summing the measured flow rates of the gas and liquid phase cryogenic fluids flowing in the gas and liquid lines, respectively;
  during a storage phase in which the flow rate of the liquid phase cryogenic fluid measured by the liquid flow rate sensor exceeds a flow rate of cryogenic fluid being directed by the third port to a downstream station, operate said three-way valve to allow a portion of the liquid phase cryogenic fluid flow in the liquid line to rise into the gas line and to allow a remaining portion of the liquid phase cryogenic fluid flow in the liquid line to exit the three-way valve through the third port; and
  during a withdrawal phase in which the flow rate of the liquid phase cryogenic fluid measured by the liquid flow rate sensor falls to a predetermined minimum flow rate specified by the liquid flow rate sensor, operate the three-way valve to disallow a flow of the liquid phase cryogenic fluid therethrough and to allow any of the liquid phase cryogenic fluid, that was previously allowed to rise into the gas line, to drop back down to the three-way valve to exit through the third port.

2. The flowmeter of claim 1, wherein the liquid flow rate sensor has a head loss that is less than a pressure head of the liquid between the bottom portion of the tank and the liquid flow rate sensor.

3. The flowmeter of claim 2, wherein the liquid flow rate sensor has a head loss equivalent to less than 2 meters of liquid height of the liquid phase cryogenic fluid.

4. The flowmeter of claim 1, wherein the liquid/gas phase separator is a tank.

* * * * *